United States Patent
Taylor

(10) Patent No.: US 8,893,363 B2
(45) Date of Patent: Nov. 25, 2014

(54) BLIND RIVET TOOL

(71) Applicant: Harry E. Taylor, Manchester-by-the-Sea, MA (US)

(72) Inventor: Harry E. Taylor, Manchester-by-the-Sea, MA (US)

(*) Notice: Subject to any disclaimer, the term of this patent is extended or adjusted under 35 U.S.C. 154(b) by 0 days.

(21) Appl. No.: 13/986,010

(22) Filed: Mar. 22, 2013

(65) Prior Publication Data
US 2013/0247356 A1 Sep. 26, 2013

Related U.S. Application Data

(62) Division of application No. 11/654,123, filed on Jan. 16, 2007, now Pat. No. 8,449,234.

(51) Int. Cl.
| | |
|---|---|
| B21J 15/10 | (2006.01) |
| B21J 15/32 | (2006.01) |
| B21J 15/00 | (2006.01) |
| B23P 19/04 | (2006.01) |
| B21J 15/02 | (2006.01) |
| F16B 19/10 | (2006.01) |
| B21J 15/28 | (2006.01) |
| B21J 15/04 | (2006.01) |
| F16B 13/06 | (2006.01) |

(52) U.S. Cl.
CPC .......... *F16B 19/1045* (2013.01); *B21J 15/285* (2013.01); *B21J 15/10* (2013.01); *F16B 19/1063* (2013.01); *B21J 15/105* (2013.01); *F16B 13/06* (2013.01); *F16B 19/1036* (2013.01); *F16B 19/1054* (2013.01); *B21J 15/043* (2013.01)
USPC ................ 29/243.53; 29/525.06; 29/243.521; 29/812.5; 72/453.17; 72/453.19; 72/466.4; 72/466.5

(58) Field of Classification Search
USPC .......... 29/243.53, 243.521, 244, 34 B, 812.5, 29/522, 525.05, 525.06; 72/453.17, 72/453.19, 466.4, 466.5
See application file for complete search history.

(56) References Cited

U.S. PATENT DOCUMENTS

| | | | | |
|---|---|---|---|---|
| 3,328,985 | A | * | 7/1967 | Keymer ................ 29/243.528 |
| 3,504,519 | A | * | 4/1970 | Hornung ............... 29/243.521 |
| 3,774,437 | A | * | 11/1973 | Young ................... 29/243.526 |
| 3,831,424 | A | | 8/1974 | James |
| 4,425,782 | A | * | 1/1984 | Todisco ................... 72/370.01 |
| 4,493,205 | A | * | 1/1985 | Ramey ................... 29/243.517 |
| 4,619,394 | A | * | 10/1986 | Knispel et al. ............... 227/156 |
| 4,706,869 | A | * | 11/1987 | Knispel et al. ............... 227/156 |
| 5,351,379 | A | * | 10/1994 | Chu ....................... 29/243.525 |
| 5,437,085 | A | * | 8/1995 | Liu ........................ 29/243.521 |
| 5,469,610 | A | * | 11/1995 | Courian et al. .......... 29/243.521 |
| 5,500,990 | A | * | 3/1996 | Wihan .................... 29/243.525 |
| 5,682,659 | A | * | 11/1997 | Chang .................... 29/243.523 |
| 5,729,880 | A | * | 3/1998 | Ko ......................... 29/243.521 |

(Continued)

FOREIGN PATENT DOCUMENTS

GB 648429 * 7/1948

*Primary Examiner* — David Bryant
*Assistant Examiner* — Darrell C Ford

(57) ABSTRACT

A conventional blind rivet tool with modified nose housing, i.e., a rivet gun with replaceable and interchangeable nosepieces, facilitates feeding and setting of multiple diameters of blind rivets with substantially shortened exposed mandrel portions extending beyond the head flange of the rivet, all while maintaining blind rivet performance and reducing total installed blind rivet costs. A rivet with a reduced exposed mandrel protrusion relative to conventional and standardized mandrels can be enabled and more easily fed through the tool.

2 Claims, 9 Drawing Sheets

(56) References Cited

U.S. PATENT DOCUMENTS

| | | | |
|---|---|---|---|
| 6,018,978 A * | 2/2000 | Aniento | 72/391.4 |
| 6,115,900 A * | 9/2000 | Cerulo et al. | 29/243.521 |
| 6,449,822 B1 * | 9/2002 | Gilbert et al. | 29/243.521 |
| 6,622,363 B2 * | 9/2003 | Komsta | 29/243.525 |
| 6,651,301 B1 * | 11/2003 | Liu | 29/243.521 |
| 7,032,281 B1 * | 4/2006 | Lin | 29/243.525 |
| 7,377,017 B1 * | 5/2008 | Manak | 29/243.521 |
| 7,407,070 B2 * | 8/2008 | Hezeltine | 227/10 |
| 7,467,451 B2 * | 12/2008 | Cobzaru et al. | 29/243.521 |
| 7,832,074 B2 * | 11/2010 | Stevenson et al. | 29/407.01 |
| 8,161,622 B2 * | 4/2012 | King et al. | 29/524.1 |
| 8,677,588 B2 * | 3/2014 | Soller | 29/243.525 |
| 2004/0010898 A1 * | 1/2004 | Lalonde et al. | 29/243.521 |
| 2006/0059678 A1 * | 3/2006 | Mauer et al. | 29/525.06 |
| 2007/0169327 A1 * | 7/2007 | Cobzaru et al. | 29/243.521 |
| 2007/0271764 A1 * | 11/2007 | Stevenson et al. | 29/522.1 |
| 2008/0170926 A1 * | 7/2008 | Taylor | 411/43 |
| 2009/0205192 A1 * | 8/2009 | King et al. | 29/525.06 |
| 2011/0209341 A1 * | 9/2011 | Ko | 29/720 |
| 2013/0247345 A1 * | 9/2013 | Lin | 29/243.53 |

\* cited by examiner though to be a division of application Ser. No. 11/654,123 filed on Jan. 16, 2007, and issued as U.S. Pat. No. 8,449,234. The entire disclosure of the above application is incorporated by reference herein.

BLIND RIVET TOOL

CROSS-REFERENCE TO RELATED APPLICATIONS

This is a division of application Ser. No. 11/654,123 filed on Jan. 16, 2007, and issued as U.S. Pat. No. 8,449,234. The entire disclosure of the above application is incorporated by reference herein.

FIELD OF THE INVENTION

The present invention relates to blind rivets, such as those suitable for joining multiple components of a workpiece together. The present invention is more particularly related to a blind rivet, and corresponding method of use and tool for blind rivet installation, wherein the material required to manufacture the blind rivet is significantly reduced without any detrimental effect to blind rivet fastening performance, thus reducing material quantity and costs.

BACKGROUND OF THE INVENTION

Blind rivets are fasteners that are permanently installed in a workpiece 26 (see FIG. 2). Most often, the workpiece 26 is formed of two components or layers, but can be in the form of one to multiple components. When there are multiple components to the workpiece 26, the components are joined together by the blind rivet fastener. Blind rivets are installed from only one side of a workpiece 26, thus being blind to an opposite side. The portion of the rivet on the blind side of the workpiece is mechanically deformed during installation by compression and expansion to form an upset head. Because blind rivets are installed from only one side of the workpiece 26, they are cost-efficient and versatile.

Blind rivets were originally designed to accommodate situations where only one side of the workpiece was accessible to the installer. Early adopters of the blind rivet include the automobile industry and the aircraft industry. Blind rivets offer numerous benefits to installers, including speed of installation, versatility, simplicity, and relatively low installed cost in most instances. Unlike many other fasteners, it is generally not possible to under-torque, over-torque, or loosely set a blind rivet since the clamping load is determined by a predetermined breaking load of the blind rivet mandrel.

A blind rivet 10 is conventionally a two-piece fastener that consists of a hollow rivet shank or body 12 having a flared flange 14 portion at one end, and a mandrel 16 passing through the blind rivet body 12 (see FIG. 1). The flange 14 end is the head of the blind rivet. At the opposite end of the body 12 is either an aperture 18, or a closed end (not shown), either of which couple with a head 20 portion of the headed mandrel 16. A one-piece (or closed end) version has a body that is fixedly and integrally coupled with the mandrel, while the two-piece version has a body that is removably coupled with the headed mandrel. The two-piece version is formed by inserting a mandrel with a small interference fit bulge into the blind rivet body.

The rivet body 12 is typically round. The diameter of the rivet body 12 and the grip length that the blind rivet is capable of fastening determines the blind rivet size. A hole, or core 22, most often extends along the length of the rivet body 12.

The mandrel 16, while coupled with the rivet body 12 at one end, extends or protrudes beyond the flared flange 14 portion of the rivet body 12 at the opposite end, creating an exposed portion 30 of the mandrel 16 having a length dimension $P_{PA}$. Most often, the mandrel 16 closely resembles a nail or wire structure.

A riveting tool physically grabs the exposed mandrel portion 30 that extends beyond the flange 14 portion of the rivet body during installation of the blind rivet. During installation, the rivet body 12 is inserted in a hole in the workpiece 26. After passing through a blind riveting tool anvil, jaws grip the portion of the mandrel that extends beyond the flange 14 of the rivet body, i.e., the exposed mandrel portion 30, and pull the mandrel 16. Because the flange 14 of the rivet body 12 holds the rivet body 12 in place, and the mandrel head 20 is larger than the aperture 18 of the rivet body 12 at the opposite end of the blind rivet 10, the rivet body 12 compresses longitudinally and expands radially outwardly to form a blind-side head. At a predetermined setting force or tensile load, the mandrel 16 is generally designed to break away at or proximal to the head of the mandrel (or the approximate location at which the mandrel couples with the rivet body). Thus, a significant portion of the mandrel 16 falls out of the rivet body 12 in the setting process. The portion that breaks away is sometimes referred to as a spent mandrel 24. A blind head 28 is on the blind side of the workpiece 26 after the rivet has been set, and the rivet flange 14 is on the work side of the workpiece 26, thus holding the workpiece 26 together.

Blind rivets are available in a variety of, diameters, materials, and head styles. Materials used to form the blind rivets include steel, stainless steel, aluminum, copper, brass, and plastic. Blind rivets are commonly classified as either pull-type or drive-pin-type fasteners.

However, generally there is no significant variation in the length dimension $P_{PA}$ of the exposed mandrel portion 30. In fact, the length dimension $P_{PA}$ of the exposed mandrel portion 30 has been standardized. One of the standards organizations that specify requirements of blind rivets in the United States is the Industrial Fasteners Institute of Cleveland, Ohio. Under the IFI STANDARD®, and specifically IFI-114, the length of the exposed mandrel portion is identified as "P" in Table 1 of the Standard. In all instances, dimension "P" is specified to have a dimension of 1-inch or greater (IFI-114—Standard for Break Mandrel Blind Rivets—Issued: November 1973; Revised: February 2003).

The 1-inch minimum dimension of the IFI-114 Standard (dimension "P") indicates that the portion of the mandrel extending beyond the flange 14 portion of the rivet body, i.e., the length dimension $P_{PA}$ of the exposed mandrel portion 30, must be at least 1-inch or more (specifically, 1.0 in. for blind rivets sized #3 and #4 having body diameters of 3/32 in. and 4/32 in. respectively, 1.06 in. for blind rivets sized #5 and #6 having body diameters of 5/32 in. and 6/32 in. respectively, or 1.25 in. for blind rivets sized #8 having a body diameter of 8/32 in., according to the Standard). This means that the mandrel 16 itself will typically have a length of about one inch plus the distance of a length dimension $L_{RB}$ of the rivet body 12 to the mandrel head 20. Because the mandrel 16 most often breaks at or proximal to the mandrel head 20, in almost all instances of blind rivet installation, the spent mandrel 24 (the portion that breaks away during the setting operation) has a length dimension $L_{PA}$ of at least 1-inch, and is most often greater than 1-inch or more by the length of the rivet body.

The spent mandrel 24 is often discarded by the installer, i.e., thrown away, after each blind rivet is set. In instances where companies have a high volume of usage for rivets, the quantity of spent mandrels can be very significant, on the order of hundreds to thousands of pounds per year. There are costs associated with the mandrels both at the manufacturing end where the rivets are made, and at the user end where the rivets are installed and the spent mandrels need to be disposed of in some form or another. Specifically, at the manufacturing end, there are raw material (steel, stainless steel, aluminum, brass, copper, plastic, etc.) costs relating to the amount of material required to form the rivet and mandrel. At the user end, there are costs associated with collecting, storing, and disposing of the spent mandrels, especially at locations where there are large quantities of rivet usage.

Any reduction in the length of the mandrel, below the 1-inch plus IFI-114 Standard dimension for the length dimension $P_{PA}$ of the exposed mandrel 30, would result in a decrease in costs both at the manufacturing end (reduction of material costs) and at the user end (reduction of costs related to collection, storage, and disposal).

However, because the IFI and others have standardized the exposed mandrel portion 30 length dimension $P_{PA}$, there has been no recognition of this problem. The standardization helps to avoid the necessity of having dramatically different riveting tools required for different mandrels. A predictable dimension of 1-inch plus means that those developing and manufacturing riveting tools can design those tools to receive a 1-inch plus exposed mandrel portion length dimension. Additionally, to develop a sufficient grip on the mandrel to pull the mandrel to deform the rivet body and then farther to the point of mandrel breakaway, the metals used to form the mandrels required a 1-inch plus exposed mandrel portion length dimension. This 1-inch plus dimension ensures that there is enough surface area on the mandrel to be inserted into the riveting tool and to be sufficiently gripped. If there is too little surface area that can be gripped by the riveting tool, then problems can develop in setting the rivet, such as the jaws of the riveting tool slipping off the mandrel at the higher tensile loads required for break away. However, this 1-inch plus dimension is merely a historical practice.

For at least the issues of the standardization of the length dimension $P_{PA}$ of the exposed mandrel portion (the 1-inch plus minimum dimension) and the requirement of having sufficient surface area of the mandrel to be griped sufficiently, the length dimension $P_{PA}$ of the exposed mandrel portion has not been adequately addressed or designated by the present standards and conventions in a way that also maximizes efficiency of material use and minimizes costs for production, use, and spent mandrel disposal.

SUMMARY

There is a need for a blind rivet design where the characteristics of the exposed mandrel portion are modified from the conventional mandrel to reduce amount and cost of materials required to produce the mandrel, while also minimizing costs related to production, use, and spent mandrel disposal, all while still making use of conventional riveting tools for rivet setting and maintaining rivet performance. The present invention is directed toward further solutions to address this need, in addition to having other desirable characteristics.

In accordance with one example embodiment of the present invention, a rivet includes a hollow body having a first end, a second end, and a tube shank extending between the first end and the second end. A head flange is configured at the second end of the hollow body. A mandrel passes through the hollow body having a first end and a second end, the first end of the mandrel coupled with the first end of the hollow body, and the second end of the mandrel extending beyond the head flange a distance of about 0.75 inches or less. The mandrel is not required to have an unsmooth surface feature for a riveting tool to capture during rivet installation.

In accordance with variations of the present invention, the rivet is a blind rivet. The first end of the hollow body can include one of an open end or a closed end, at which the first end of the mandrel couples with the first end of the hollow body. The second end of the mandrel can extend beyond the head flange a distance of at least 0.25 inches. The second end of the mandrel extends beyond the head flange a distance of between about 0.25 inches and about 0.75 inches. In fact, the rivet of the present invention can have a mandrel extending any length beyond the head flange within or including the approximate range of 0.25 inches to 0.75 inches, including distances of about 0.25 inches, about 0.3 inches, about 0.35 inches, about 0.4 inches, about 0.45 inches, about 0.5 inches, about 0.55 inches, about 0.6 inches, about 0.65 inches, about 0.7 inches, or about 0.75 inches.

In accordance with further variations of the present invention, the mandrel further includes a breakaway neck disposed proximal to the first end of the mandrel. A surface modification can be formed on the mandrel to improve gripping of the mandrel by a riveting tool. The mandrel is structured to fracture upon application of a predetermined tensile load.

In accordance with one embodiment of the present invention, a method of manufacturing a rivet includes providing a hollow body having a first end, a second end, and a tube shank extending between the first end and the second end, wherein a head flange is configured at the second end of the hollow body. A mandrel is passed through the hollow body, the mandrel having a first end and a second end. The mandrel is coupled to the hollow body, the first end of the mandrel coupling with the first end of the hollow body. The second end of the mandrel extends beyond the head flange a distance of about 0.75 inches or less.

In accordance with one aspect of the present invention, a riveting tool is provided that includes a body, a pulling force generator for activating the riveting tool, and jaw assembly within the body. The jaw assembly includes a jaw case having an angled interior annular surface, and at least two split jaws disposed against the angled interior annular surface of the jaw case for gripping mandrels of rivets inserted into the riveting tool for setting. The riveting tool further includes a removable and replaceable nosepiece attached to the body of the riveting tool. The nosepiece includes an aperture having a distal end adapted to receive the mandrels of rivets, and a proximal end adapted to contact and hold open the at least one split jaw for insertion of the mandrels therethrough. The nosepiece can be adapted for manufacture in a plurality of different sizes for receiving mandrels of correspondingly different diameters, and the distance between the distal and proximal aperture ends of each of the plurality of different sizes is substantially the same. The riveting tool can be configured to implement a multi-stage pull and release activation for setting a rivet.

In accordance with further aspects of the present invention, a method of setting a rivet includes providing a rivet that includes a hollow body having a first end, a second end, and a tube shank extending between the first end and the second end. The rivet further includes a head flange configured at the second end of the hollow body, and a mandrel passing through the hollow body and having a first end and a second end, the first end of the mandrel coupled with the first end of the hollow body. The method continues with inserting the rivet into a riveting tool and inserting the rivet into a workpiece to be riveted. The riveting tool is activated to grip a portion of the second end of the mandrel and pull the mandrel of the rivet until the hollow body is substantially deformed to set the first end of the mandrel. The mandrel is released and re-set within the riveting tool, such that the riveting tool grips a portion greater than the portion of the second end griped prior to re-setting the mandrel. The mandrel is then pulled again until the mandrel fractures.

In accordance with further variations of the present invention, the method can further include repeating the step of releasing the mandrel and re-setting the mandrel within the riveting tool, such that the riveting tool grips greater than the portion of the second end griped prior to re-setting the mandrel, prior to fracturing the mandrel. The rivet can be a blind rivet. The first end of the hollow body can include one of an open end or a closed end, at which the first end of the mandrel couples with the first end of the hollow body. The second end of the mandrel can extend beyond the head flange a distance of at least 0.25 inches. The second end of the mandrel can likewise extend beyond the head flange a distance of between about 0.25 inches and about 0.75 inches, or a distance including or between about 0.25 inches and about 0.75 inches.

In accordance with further aspects of the present invention, a method of setting a rivet can include providing a rivet having a hollow body with a first end and a second end, a head flange at the second end of the hollow body and a mandrel passing through the hollow body and having a first end and a second end. The first end of the mandrel couples with the first end of the hollow body, and the second end of the mandrel extends beyond the head flange a distance of about 0.75 inches or less. The mandrel is not required to have an unsmooth surface feature for a riveting tool to capture during rivet setting. The method continues with inserting the rivet into the riveting tool and inserting the rivet into a workpiece to be riveted. The riveting tool is activated to grip the second end of the mandrel with a portion of jaw gripping surface that is less than a complete jaw gripping surface available on a gripping jaw. A first pull is implemented by pulling the mandrel of the rivet, thus deforming the hollow body. At a state at which the hollow body is deformed sufficiently enough to enable the mandrel to travel further into the riveting tool, the mandrel is released and reset within the riveting tool, such that the riveting tool grips the mandrel with a portion of the jaw gripping surface that is a greater than the portion of jaw gripping surface used for the first pull. At least a second pull is implemented by pulling the mandrel to set the rivet. Additional re-setting of the mandrel may be required, and additional pulling steps may be required, prior to complete setting of the rivet.

BRIEF DESCRIPTION OF THE FIGURES

These and other characteristics of the present invention will be more fully understood by reference to the following detailed description in conjunction with the attached drawings, in which.

DETAILED DESCRIPTION

Figure 1:
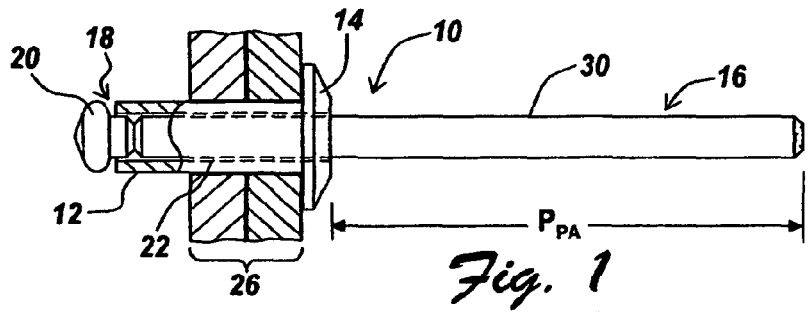
FIG. 1 is a diagrammatic illustration of a blind rivet, according to the known art of blind rivets.

An illustrative embodiment of the present invention relates to a blind rivet design having an exposed mandrel portion modified from the conventional and standardized mandrel to reduce the amount and cost of the material required to produce the mandrel, while also minimizing costs related to production, use, and spent mandrel disposal, all while still making use of conventional riveting tools for blind rivet setting and maintaining rivet performance. The mandrel is not required to have an unsmooth surface feature for a riveting tool to capture during rivet installation. To work with the inventive blind rivet design, a conventional riveting tool, i.e., a rivet gun with a replaceable nose housing and modified nosepiece, may be utilized, with a modified nose housing attached. The modified nose housing and modified nosepiece on the conventional rivet setting tool enables use of a mandrel having a reduced exposed mandrel portion relative to conventional and standardized, mandrels. In addition, a modified stepped approach to setting the rivet may also be utilized in conjunction with the inventive rivet design to enable use of an even further reduced exposed mandrel portion. The present invention is directed toward further solutions to address this need, in addition to having other desirable characteristics.

A number of figures encompassed within FIGS. 1 through 10, wherein like parts are designated by like reference numerals throughout, illustrate example embodiments, or are utilized in describing inventive aspects of a blind rivet, a rivet setting tool with modified nosepiece and modified nose housing, and a stepped rivet setting procedure, according to the present invention. Although the present invention will be described with reference to the example embodiments illustrated in the figures, it should be understood that many alternative forms can embody the present invention. One of ordinary skill in the art will additionally appreciate different ways to alter the parameters of the embodiments disclosed, such as the size, shape, or type of elements or materials, in a manner still in keeping with the spirit and scope of the present invention.

Figure 3:
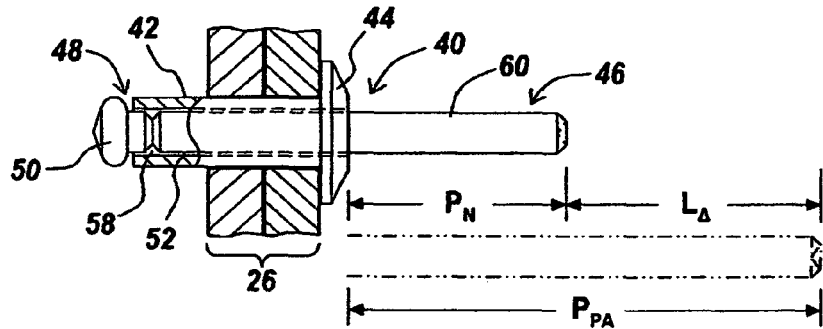
FIG. 3 is a diagrammatic illustration of a blind rivet, according to one embodiment of the present invention.

Turning now to FIG. 3, a blind rivet 40 in accordance with the present invention is provided. The blind rivet 40 is depicted as a two-piece fastener; however, one of ordinary skill in the art will appreciate that the blind rivet 40 can be made as a one-piece fastener, or other configuration. The example blind rivet 40 consists of a hollow rivet shank or body 42 having a flared flange 44 portion at one end, and a modified mandrel 46 passing through the rivet body 42. The flange 44 end is the head of the blind rivet 40. At the opposite end of the body 42 is either an aperture 48, or a closed end 48' depicted in FIG. 10, either of which couple with a head 50 portion of the modified mandrel 46. A one-piece version has a body that is fixedly and integrally coupled with the mandrel, while the two-piece version has a body that is removably coupled with the modified mandrel 46. The two-piece version is formed by inserting a mandrel with a small interference fit bulge into the blind rivet body.

The rivet body 42 is typically round. The diameter and grip length of the rivet body 42 determines the blind rivet size. A hole, or core 52, most often extends along the length of the rivet body 42.

The modified mandrel 46, while coupled with the rivet body 42 at one end, extends or protrudes beyond the rivet body 42 and flange 44 at the opposite end, creating an exposed portion 60 of the mandrel 46 having a length dimension $P_N$. Most often, the modified mandrel 46 closely resembles a nail or wire structure. The modified mandrel, like conventional mandrels, does not require an unsmooth surface feature for a riveting tool to capture during rivet installation. Said differently, some other prior mandrel configurations have included various surface feature modifications, such as notches, grooves, knurls, or other equivalent surface features, to enable the mandrel to be appropriately captured by a riveting tool for rivet setting. The present invention can make use of mandrels with such surface features, however, in contrast to other prior configurations, there is no requirement or need for the modified mandrel 46 of the present invention to have such surface feature modifications. The modified mandrel 46 can be set with a conventional rivet setting tool as described below, without requiring modifications to the otherwise generally smooth surface of the mandrel. Thus, there is no requirement for the modified mandrel to have an unsmooth surface feature. The modified mandrel 46 can be made in accordance with conventional practices, however, with the length of the modified mandrel 46 adjusted to comply with the present invention. For example, the modified mandrel 46 can be made by supplying a continuous spooled wire to a mandrel forming machine. The wire is cut at predetermined lengths in compliance with the present invention as later described, and later assembled with separately manufactured rivet bodies 42. Some embodiments of the modified mandrel 46 may include, but do not require, a surface having annular grooves (not shown), or other roughened surface, to increase the gripability of the rivet setting tool when setting the blind rivet 40.

The modified mandrel 46 further may include a breakaway neck 58 at the end proximal the head 50. The breakaway neck 58 can be implemented in a number of different ways, as understood by those of ordinary skill in the art, including crimping in the mandrel header, simultaneously rolling the breakaway neck 58 in a thread roller that rolls annular gripping groves, etching, notching, narrowed diameter, and the like. The function of the breakaway neck 58 is to provide a point of weakness along the length of the modified mandrel 46 at which the mandrel 46 is made more likely to break away when the desired tensile load is placed on the mandrel during the rivet setting process, as later described.

As mentioned in the Background of the present specification, the 1-inch minimum dimension of the IFI-114 Standard (dimension "P") requires that the portion of the mandrel extending beyond the flange of the rivet body, i.e., the length dimension $P_{PA}$ of the exposed mandrel portion 30, must be at least 1-inch or more (specifically, 1.0 in. for blind rivets sized #3 and #4 having body diameters of 3/32 in. and 4/32 in. respectively, 1.06 in. for blind rivets sized #5 and #6 having body diameters of 5/32 in. and 6/32 in. respectively, or 1.25 in. for blind rivets sized #8 having a body diameter of 8/32 in., according to the Standard).

Contrary to the IFI-114 Standard, and in accordance with embodiments of the present invention, a length dimension $P_N$ of the exposed mandrel portion 60 of the blind rivet 40 is shorter than the conventional length dimension $P_{PA}$ of the exposed mandrel 30 as known in the art. Specifically, the length dimension $P_N$ of the exposed mandrel portion 60 for a rivet having a body diameter of, for example, either 3/32 in. or 4/32 in. is less than about 0.75 inches, and in most implementations greater than about 0.25 inches, and includes any dimension therebetween. The actual length dimension $P_N$ of the exposed mandrel portion 60 may vary slightly with each different size implementation of the blind rivet 40; although such variation in length is not required with the embodiments of the present invention. In addition, it should be noted that the primary factor determining the maximum length of the length dimension $P_N$ of the exposed mandrel portion 60 is the desire to reduce the amount of material required to form the modified mandrel 46, and to simplify usage of the blind rivet 40, while maintaining conventional rivet performance and also the ability to set the rivet with conventional tools. The specific examples utilized here with regard to the sized #3 and #4 blind rivets are likewise not intended as limiting to the present invention, but merely represent some actual dimensions and rivet sizes appropriate for some implementations.

It should be noted that it is well appreciated that the variation of a dimension of a particular device is somewhat variable in general. However, the present invention is directed to the reduction of a dimension that is otherwise understood by those of ordinary skill in the art to be the minimum dimension required by standards organizations, such as the IFI STANDARD®, to make the device (a blind rivet) operational. Therefore, the reduction of the length dimension $P_{PA}$ of the exposed mandrel 30 to the length dimension $P_N$ of the exposed mandrel portion 60 relative to what one of ordinary skill in the art would expect, and relative to a standardized minimum, goes beyond the otherwise expected and predictable variation in dimension.

Furthermore, it should be appreciated that any value of the length dimension $P_N$ of the exposed mandrel portion 60 that is less than 1-inch represents a reduction in length dimension $P_{PA}$ of the conventional exposed mandrel portion 30 known in the art, and therefore represents a reduction in the amount of materials required to make such a mandrel relative to conventional mandrels. However, within a certain range of the 1-inch plus dimension, conventional rivet setting tools with minor modifications such as shortened anvils will still operate to set the blind rivet, and the reduction in materials required to form the mandrel of the blind rivet would be minimal. Therefore, the present invention attempts to identify a value for the length dimension $P_N$ of the exposed mandrel portion 60 that is both sufficient to cause a substantial and useful reduction in materials required to form the modified mandrel 46, while also still being operational with a conventional rivet setting tool having a removable and replaceable modification to a combination of the anvil and the nose housing thereof, as described below. The maximum dimensions of about 0.75 inches is believed to represent that value. However, a length dimension $P_N$ of the exposed mandrel portion 60 of about 0.5 inches is a generally preferred length for both maximizing efficiencies gained with the present invention and also maintaining the ability to operate with conventional rivet setting tools.

A substantial and useful reduction in material required to form the modified mandrel 46 can be interpreted to mean that amount that results in a substantial decrease in costs both at the manufacturing end by reducing the amount of material required to form the modified mandrel 46, and at the user end by reducing the weight and volume of collected spent mandrels that require storage and eventual disposal, as well as shortening the spent mandrel length to improve vacuum operated collection. The length dimension $P_N$ of the exposed mandrel portion 60 being about 0.75 inches or less on a size #3 or #4 rivet with body diameter of 3/32 in. or 4/32 in. results in about a 17% reduction in material amount required to form the modified mandrel 46 relative to a conventional mandrel 16 having the length dimension $P_N$ of the exposed mandrel portion 60 of at least 1-inch or more on popular sizes of rivets. In locations where thousands of blind rivets are manufactured and/or used, this could result in a significant cost savings.

While the present invention has been described with the length dimension $P_N$ of the exposed mandrel portion 60 being less than about 0.75 inches, one embodiment of the present invention implements the length reduction to result in the length dimension $P_N$ of the exposed mandrel portion 60 being about 0.5 inches or less for a size #3 or #4 rivet with body diameter of 3/32 in. or 4/32 in. This dimension of about 0.5 inches further reduces the material amounts involved in forming the modified mandrel 46, and in conjunction with the rivet setting tool with modified nosepiece and modified nose housing as described below, can still make use of a conventional rivet setting tool. Therefore, a generally preferred length dimension $P_N$ of the exposed mandrel portion 60 is about 0.5 inches for a size #3 or #4 rivet with body diameter of either 3/32 in. or 4/32 in., although it is understood that a dimension of up to about 0.75 inches can have some benefit, albeit lesser than the benefit realized at a dimension of about 0.5 inches or less. In addition, a minimum dimension of about 0.25 inches still provides sufficient length for, gripping the mandrel during rivet setting with a conventional rivet setting tool when a stepped setting method is used.

Figure 2:
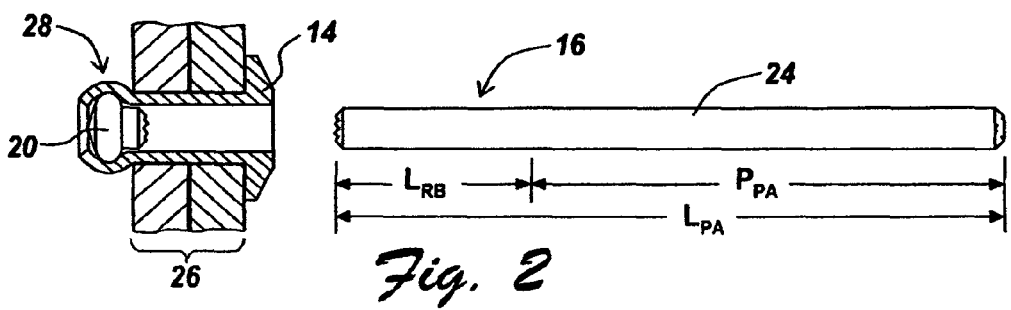
FIG. 2 is a cross-sectional illustration of the blind rivet of FIG. 1, after rivet installation, according to the known art of blind rivets.
Figure 4:
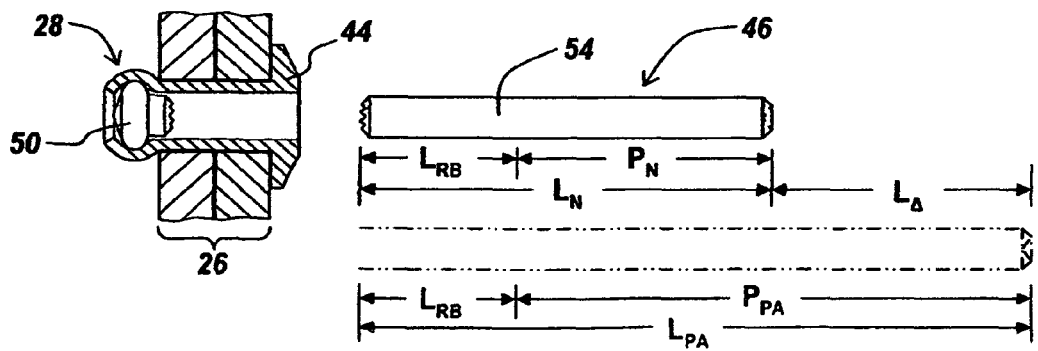
FIG. 4 is a cross-sectional illustration of the blind rivet of FIG. 3, after rivet installation, according to one aspect of the present invention.
Figure 10:
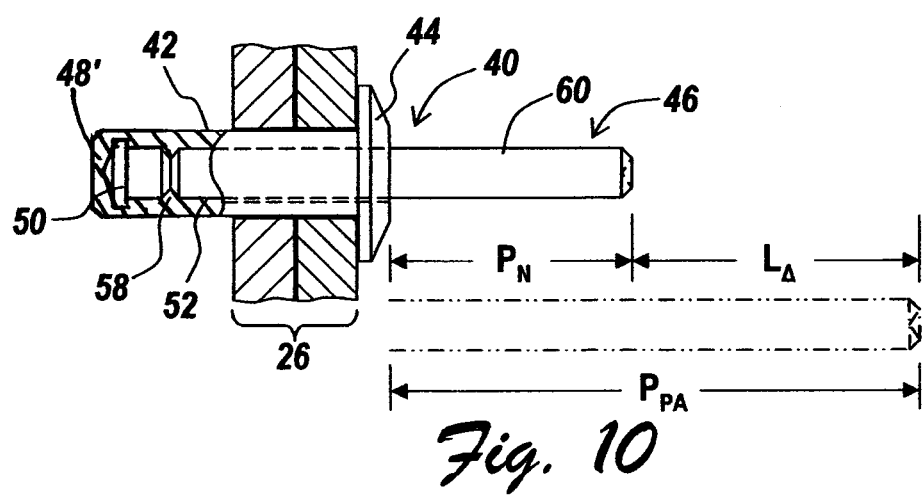
FIG. 10 is a diagrammatic illustration of a closed end blind rivet, according to one embodiment of the present invention.

FIGS. 3, 4, and 10 illustrate the modified mandrel 46 of the present invention, and additionally illustrate a comparison with a conventional mandrel, such as the mandrel 16 of the blind rivet 10 illustrated in FIGS. 1 and 2. In FIG. 3 and in FIG. 10 the inventive blind rivet 40 includes the exposed mandrel portion 60. The length dimension $P_N$ of the exposed mandrel portion 60 is about 0.5 inches. The exposed mandrel portion 30 of the conventional blind rivet 10 of FIG. 1 is shown in hidden lines to indicate the relative dimensions. The length dimension $P_{PA}$ of the exposed mandrel portion 30 of the conventional blind rivet 10 is about 1.06-inch. A difference in the length ($L_A$) between the length dimension $P_N$ of the exposed mandrel portion 60 and the length dimension $P_{PA}$ of the exposed mandrel portion 30 of the conventional blind rivet 10 is therefore about 0.56 inches in the illustrative embodiment. As shown in FIG. 4, after the modified mandrel fractures at the breakaway neck 58, a spent mandrel 54 has a length dimension $L_{RB}$ of the mandrel portion that was within the rivet body 42 up to the point of fracture, plus the length dimension $P_N$ of the exposed mandrel portion 60 to result in a total length dimension of the spent mandrel 54 resulting from the modified mandrel 46 of $L_N$. The similarly formed spent mandrel 24 resulting from the conventional mandrel 16 has the same length dimension $L_{RB}$ of the mandrel portion that was within the rivet body 12 up to the point of fracture, plus the length dimension $P_{PA}$ of the exposed mandrel portion 30 of the conventional blind rivet 10, to result in a total length dimension of the spent mandrel 24 resulting from the conventional blind rivet 10 of $L_{PA}$. The difference in the length $L_A$ between the conventional spent mandrel 24 and the modified spent mandrel 54 is, in the example embodiment, about 0.56 inches, because the difference in the length $L_A$ between the length dimension $P_N$ of the exposed mandrel portion 60 and the length dimension $P_{PA}$ of the exposed mandrel portion 30 of the conventional blind rivet 10 was about 0.56 inches. In this example, the reduction in the length dimension $P_{PA}$ of the exposed mandrel portion 30 of the conventional blind rivet 10, reduced down to the length dimension $P_N$ of the exposed mandrel portion 60 of the modified mandrel 46 is about 0.56 inches, divided by a sum (length dimension $L_{RB}$ of 0.43 inches+length dimension $P_{PA}$ of 1.06 inch), resulting in a reduction in mandrel material of almost 38%.

One of ordinary skill in the art will appreciate that the difference in the length $L_A$ between the length dimension $P_N$ of the exposed mandrel portion 60 and the length dimension $P_{PA}$ of the exposed mandrel portion 30 of the conventional blind rivet 10 can range between a plurality of length dimensions as desired. For example, a mandrel having a difference in the length $L_A$ dimension approaching zero, will be a more conventional sized mandrel. A mandrel having a difference in the length $L_A$ dimension approaching about 0.25 inches through about 0.75 inches, to as much as about 1-inch or greater, will be a mandrel in compliance with the characteristics of the present invention, and demonstrate significant efficiencies over the conventional and standardized blind rivet art.

The present invention, thus, recognizes that the conventional and standardized mandrels of blind rivets as previously constructed were excessive for the required functionality of the set blind rivet fastening. The blind rivet of the present invention shortens the length of the mandrel, creating the modified mandrel 46, which can be utilized as described below to install the blind rivet 40 using a modified conventional rivet setting tool.

In addition, one of ordinary skill in the art will appreciate that the blind rivet 40 can be made in a variety of, diameters, materials, and head styles. Materials used to form the blind rivet 40 include, but are not limited to, steel and stainless steel, aluminum, copper, brass, and plastic. The diameters of the blind rivet 40 can be any diameter as previously manufactured for conventional rivets. There are no limitations placed on the diameter dimension of the blind rivets by the present invention. In addition, there are varieties of different head styles for rivets. The present invention operates using all known diameters, materials, and head styles known in the blind rivet art.

Figure 5A:
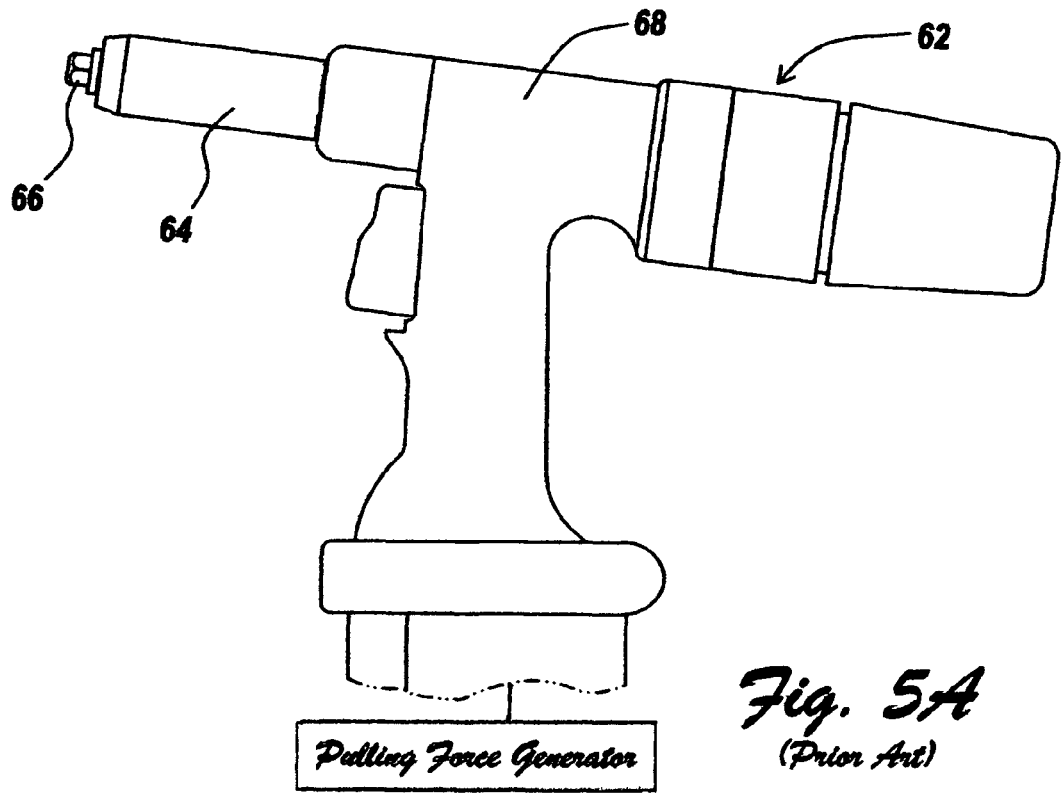
FIGS. 5A & 5B are diagrammatic illustrations of a conventional blind rivet setting tool, in accordance with the known art of blind riveting.
Figure 5B:
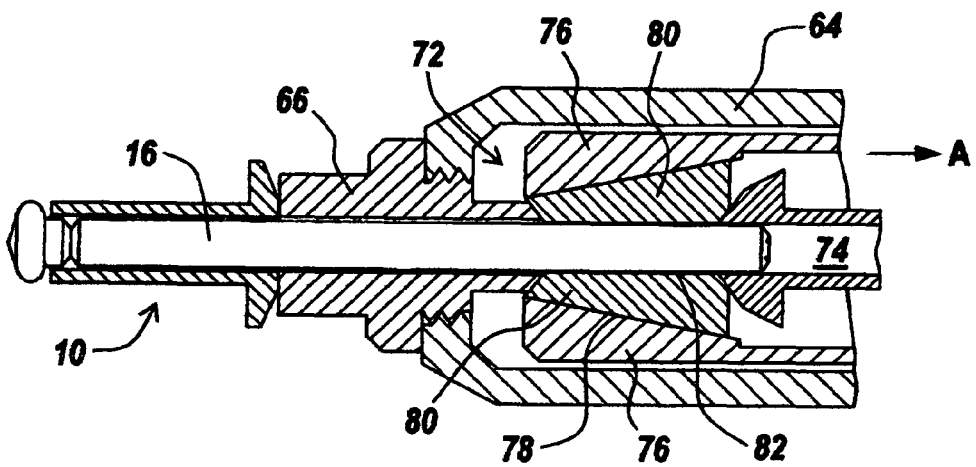
Figure 6A:
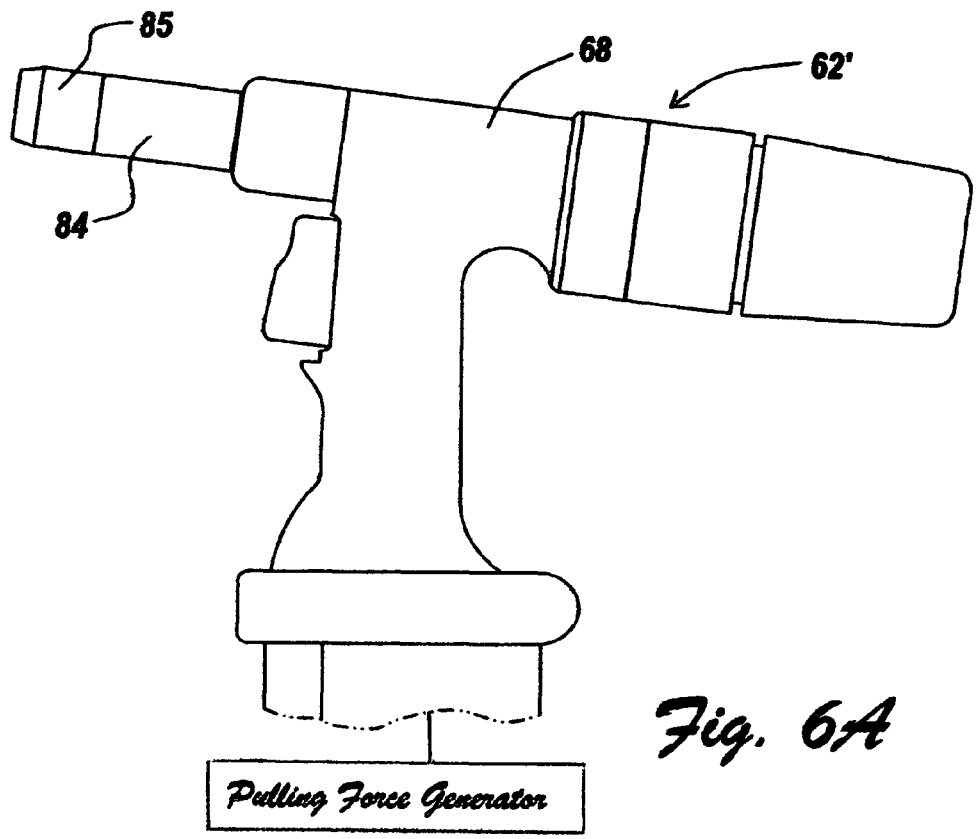
FIGS. 6A & 6B are diagrammatic illustrations of a conventional blind rivet setting tool with modified nosepiece and modified nose housing, in accordance with one aspect of the present invention.
Figure 6B:
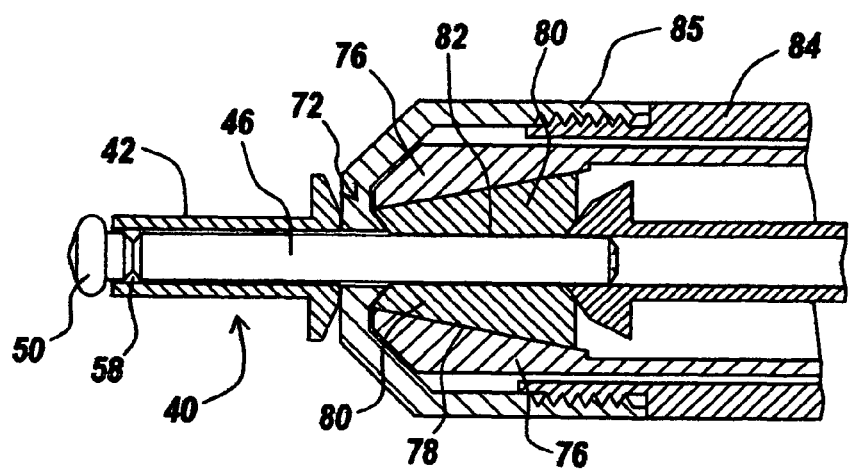

In operation, the blind rivet 40 of the present invention (or a conventional blind rivet 10) can be set or installed using a conventional riveting tool 62, as depicted in FIGS. 5A and 5B. Alternatively, or for embodiments where the difference in the length $L_A$ dimension is greater such that the mandrel does not sufficiently reach the jaw assembly, the blind rivet 40 of the present invention can be set or installed using a conventional riveting tool 62 having a modified nosepiece 85 and modified nose housing 84, as depicted in FIGS. 6A and 6B. The conventional riveting tool 62 includes a nose housing 64, and an annular anvil 66 threadedly coupled with the nose housing 64. The nose housing 64 can likewise be threadedly coupled with a body 68 of the riveting tool 62, making it easily removable to access the inner-workings of the front end of the tool 62, and also for replacement. The riveting tool 62 or 62' further includes a pulling force generator (see FIGS. 5A and 6A) such as a mechanical, electrical, pneumatic, or the like, mechanism for activating the tool 62 or 62' and setting or installing a blind rivet. Inside the nose housing 64 of the riveting tool 62 is a jaw assembly 72. The jaw assembly 72 includes a mandrel aperture 74 through which the mandrel 16 of the conventional blind rivet 10 can pass. The jaw assembly is operatively coupled with a pulling force generated by the force generating mechanism. One of ordinary skill in the art will appreciate that there are many known mechanisms for translating force provided by a user manually, or by a machine (pneumatic, hydraulic, electric, or other force) or otherwise, to generate a pulling force in a rivet setting tool. Accordingly, details of these well known mechanisms will not be provided herein. It is sufficient to indicate that a pulling force is generated by operation of the riveting tool 62 that acts upon a jaw case 76 of the jaw assembly.

The jaw assembly further includes the jaw case 76 having an angled wedge 78 shape that is disposed against two or more split jaws 80. The two or more split jaws 80 typically have gripping teeth 82 on their surface that contacts the mandrel to improve the ability of the split jaws to grip and hold the mandrel during rivet setting operations.

The exposed mandrel portion 30 (or mandrel portion 60 for the blind rivet 40 of the present invention) that extends beyond the rivet body 12 and flange 14 is physically grabbed by a riveting tool during installation of the rivet. Specifically, during installation, the rivet body 12 is inserted in a hole in the workpiece 26. After passing through the anvil 66, jaws of a riveting tool grip the portion of the mandrel that extends beyond the flange of the rivet body, i.e., the exposed mandrel portion 30, and pulls the mandrel 16. Because the flange 14 of the rivet body 12 holds the rivet body 12 in place, and the mandrel head 20 is larger than the aperture 18 of the rivet body 12 at the opposite end of the rivet 10, the rivet body 12 compresses longitudinally and expands radially outwardly to form a blind-side head. At a predetermined setting force or tensile load, the mandrel 16 is designed to break away at or proximal to the head of the mandrel (or the approximate location at which the mandrel couples with the rivet body). Thus, a significant portion of the mandrel 16 falls out of the rivet body 12 in the setting process. The portion that breaks away is a spent mandrel 24. A blind head 28 is on the blind side of the workpiece 26 after the rivet has been set, and the rivet flange 14 is on the work side of the workpiece 26, thus holding the workpiece 26 together.

To begin the process of rivet setting, a user supplies or inserts a mandrel 16 of a blind rivet 10 into the riveting tool 62 through the anvil 66 and into the split jaws 80 and the mandrel aperture 74 of the jaw assembly 72. The pulling force is provided, and the jaw case 76 moves in the general direction of Arrow A. This causes the angled wedge 78 to translate pressure against the split jaws 80, causing the split jaws to compress against the mandrel 16 and begin moving in the direction of Arrow A, along with the jaw case 76. The greater the pulling force and the greater the resistance provided by the strength of the mandrel 16 and its resistance to stretching, the greater the force is bearing down on the mandrel 16 by the split jaws 80, preferably preventing the split jaws 80 from slipping on the mandrel 16.

If there is an insufficient grip on the mandrel 16, or if the mandrel 16 proves to be too resistant to stretching, the riveting tool 62 may slip and the rivet will not be set properly. This is partly the origin of the requirement for a 1-inch minimum exposed mandrel portion 30, to ensure that the split jaws 80 have sufficient surface area to grip and pull the mandrel until the predetermined setting force or tensile load is achieved, causing the mandrel 16 to break away, and the blind rivet to be set.

FIGS. 6A and 6B illustrate a riveting tool 62' substantially similar to that of FIGS. 5A and 5B, but with a slight modification in the form of a modified nosepiece 85 and modified nose housing 84. The nose housing 64 of the conventional riveting tool 62 is most often threaded and easily removable and replaceable with a similarly threaded and sized nose housing. The present invention takes advantage of this modular feature to replace the standard nose housing with the modified nose housing 84 of FIGS. 6A and 6B, which includes a modified nosepiece 85. The modified nosepiece 85 replaces the anvil 66 of the conventional riveting tool, and the modified nose housing 84 is configured to receive the modified nosepiece 85. The modified nosepiece 85 and modified nose housing 84 enable the mandrel (in this instance the modified mandrel 46) to reach and extend through the split jaws 80 and into the mandrel aperture 74. Therefore, the modified mandrel 46, being a difference in length $L_A$ between the length dimension $P_N$ of the exposed mandrel portion 60 and the length dimension $P_{PA}$ of the exposed mandrel portion 30 of the conventional blind rivet 10, can still reach the full surface of gripping teeth 82 provided by the split jaws 80, and thus can transfer the full pulling force provided by the riveting tool 62' required for rivet setting.

Figure 6C:
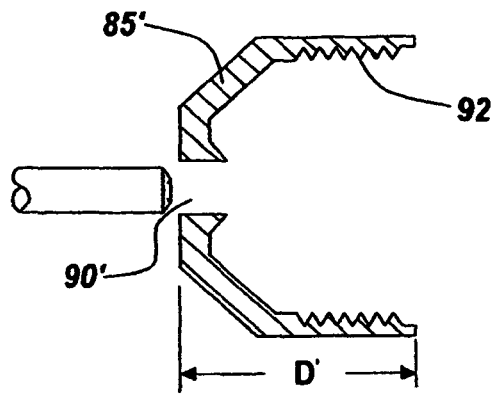
FIGS. 6C, 6D, & 6E are further illustrations of variations in the modified nosepiece to accommodate different diameter rivet mandrels, in accordance with aspects of the present invention.
Figure 6D:
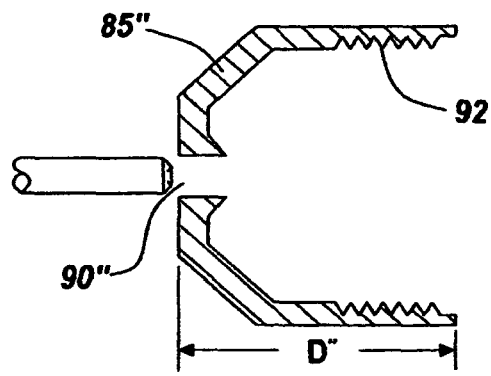
Figure 6E:
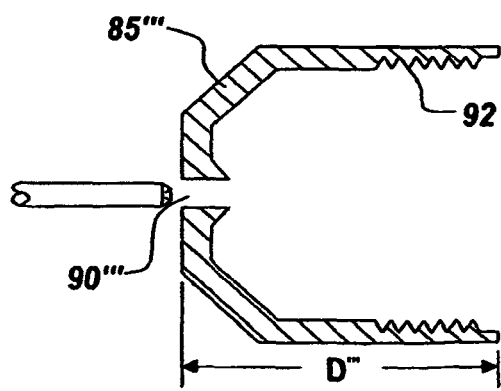

In addition, FIGS. 6C, 6D, and 6E illustrate the ability of the modified nose housing 84, and specifically the removable modified nosepiece 85, to accommodate a number of different conventional rivet mandrel diameter dimensions. As shown, the modified nosepiece 85 includes an aperture 90 and a threaded inner surface 92 for coupling the modified nose piece 85 in a modular or removable and replaceable manner with the modified nose housing 84, which then couples with a conventional rivet setting tool (such as riveting tool 62, or 62'). Specifically, a dimension D', D", or D'" is a distance from a base of the modified nosepiece 85 to an opposite end of the modified nosepiece 85 at which the aperture 90 is disposed. As depicted, dimension D' is less than dimension D", which is less than dimension D'". In addition, aperture 90' has a greater diameter than aperture 90", which has a greater diameter than aperture 90'". The variation from dimension D' to D" to D'" (and apertures 90', 90", and 90'") results in the rivet setting tool being configured to receive a different diameter rivet mandrel. For a rivet setting tool having a modified nosepiece 85' with dimension D', and aperture 90', such tool would be configured to receive a rivet mandrel having a relatively larger diameter because the dimension D' is relatively shorter and thus pushes the split jaws 80 further apart creating a wider opening. Also, aperture 90' is relatively larger for receiving a larger diameter mandrel. The largest mandrel that a blind riveting tool is capable of handling is represented by the configuration of FIG. 6B, where the split jaws are pushed fully into the jaw case 76. Likewise, a rivet setting tool having a modified nosepiece 85" with dimension D" and aperture 90" would be configured to receive a rivet mandrel having a smaller or narrower diameter relative to the configuration having dimension D' because the split jaws 80 will not be held quite as far apart, and will partially extend in front of the jaw case 76 (not shown). Furthermore, a rivet setting tool having a modified nosepiece 85'" with dimension D'" and aperture 90'" would be configured to receive a rivet mandrel having still a smaller or narrower diameter relative to the configuration having dimension D". Thus, with a greater dimension D (such as D'"), the smaller diameter rivet mandrel is accepted by the split jaws of the riveting tool, and with a lesser dimension D (such as D'), the larger diameter rivet mandrel is accepted by the split jaws of the riveting tool. Accordingly, once the modified nose housing 84 is installed on the conventional riveting tool, the modified nosepiece 85 can be swapped out to accommodate different diameter rivet mandrels (such as, for example, on blind rivets having body diameters of 3/32 inch, 1/8 inch, 5/32 inch, or 3/16 inch) while still avoiding the excessive length requirements of the conventional mandrels. One of ordinary skill in the art will appreciate that there are variations of the modified nose housing 84 and the modified nosepiece 85 that are available. For example, the modified nose housing 84 can be combined with the modified nosepiece 85 to make a single threaded removable component for adjusting the riveting tool to receive different rivet sizes rather than being formed as two separate components. Other equivalent physical structures for making a removable and swappable housing or modified nosepiece, as would be understood by one of skill in the art, are likewise deemed to fall within the scope of the present described invention.

Figure 7A:
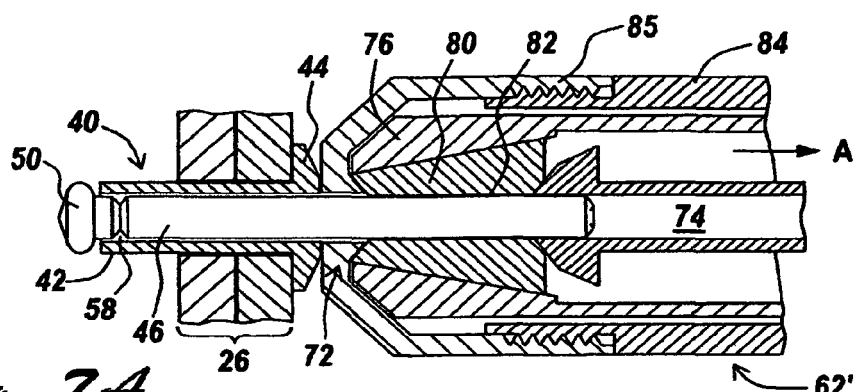
FIGS. 7A, 7B, 7C & 7D form a stepwise illustration of the blind rivet being set in a workpiece using the rivet setting tool, according to one aspect of the present invention.
Figure 7B:
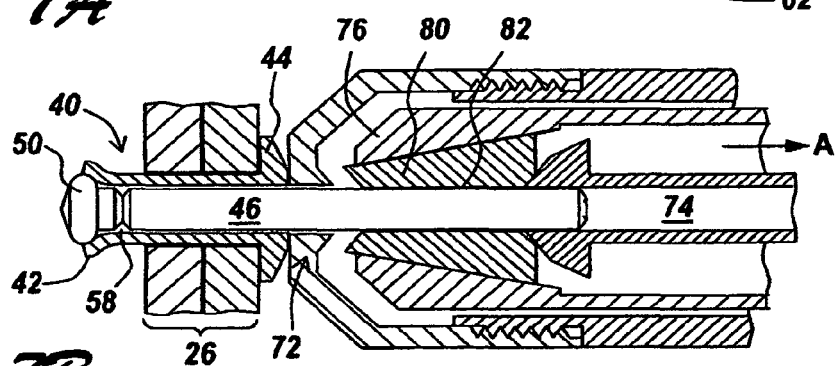
Figure 7C:
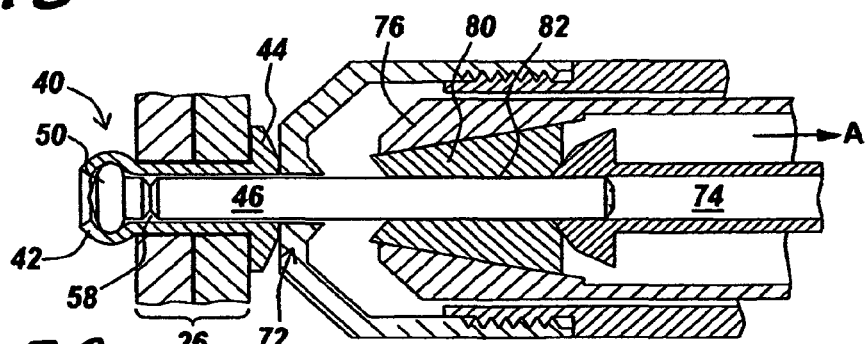
Figure 7D:
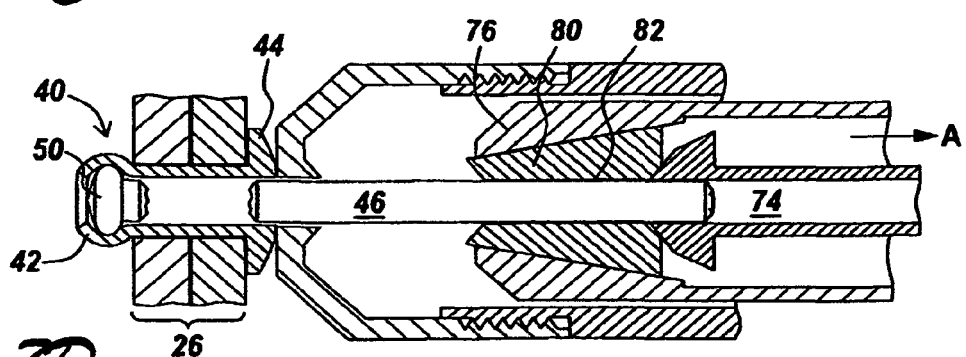

In operation, as depicted in FIGS. 7A, 7B, 7C, and 7D the blind rivet 40 of the present invention can be set by the riveting tool 62' of FIGS. 6A and 6B into a workpiece 26. In FIG. 7A, the blind rivet 40 inserts through the workpiece 26 and into the riveting tool 62' through the modified nosepiece 85 and modified nose housing 84, through the split jaws 80, and into the mandrel aperture 74. As a pulling force is generated, the jaw case 76 pulls on the angled wedge 78, and in turn, the split jaws 80. The gripping teeth of the split jaws 80 bite into the modified mandrel 46 and begin pulling in the direction of Arrow A. As shown in FIG. 7B, the body 42 of the blind rivet 40 begins to expand radially outwardly, allowing the head 50 of the mandrel 46 to pull into the body 42. As the jaw assembly 72 moves further in the direction of Arrow A, and as illustrated in FIG. 7C, the mandrel 46 pulls all the way into the body 42 of the rivet 40, and the body often bends inward around the mandrel head 50, holding the head 50 in place. The expanded body 42 is now wider than the aperture in the workpiece 26, thus the workpiece cannot come off. The flange 44 of the blind rivet 40 holds the workpiece together on the opposite side. Once the desired predetermined setting force or tensile load is achieved, the mandrel 46 breaks away at or proximal to the head of the mandrel 46, most often at the breakaway neck 58, thus setting the blind rivet 40 as shown in FIG. 7D.

As previously discussed, the length of the exposed mandrel portion 60 is the amount required to fully grip and pull the mandrel 46 with the split jaws 80 during the rivet setting operation. To come in contact with the split jaws 80, the exposed mandrel portion 60 must extend a distance sufficient for the split jaws 80 to adequately grip the mandrel 46. As the split jaws 80 pull back on the mandrel 46 (through manual, pneumatic, hydraulic, electric, or other force) the mandrel is pulled into the blind rivet body 42, then extends and stretches until finally breaking at the breakaway neck 58, preferably at a predetermined load. The Applicant has observed that as the split jaws 80 grip the mandrel 46 and travel in the direction of Arrow A, the mandrel 46 is subject to a generally increasing tensile load similar to that illustrated in FIG. 8. Specifically, the level of the tensile load varies over the setting stroke of the riveting tool 62', and is somewhat dependent upon the geometry of the workpiece 26 and the metal types of the blind rivet 40.

There is an initial movement of the mandrel 46 at the outset of the pulling motion at a relatively low load (Zone A)(see also FIG. 7A). This is associated with the split jaws 80 initially gripping the mandrel 46 and pulling the head 50 into snug contact with the body 42 of the blind rivet 40, and the head 50 beginning to move into the body 42. It should be noted that manufacturing assembly processes associated with mandrels and assembly methods can result in blind rivet assemblies where the underside of the blind rivet mandrel head 50 is assembled and supplied slightly displaced from the rivet body 42. Once the largest diameter portion of the head 50 has fully engaged the rivet body 42 (see also FIG. 7B) the load increases in a generally linear progression as increasing force is loaded onto the rivet body 42 (Zone B). As components of the work piece 26 are pulled together and the blind rivet body 42 expands to fill the void between the body 42 and the work piece 26, and the head 50 approaches the blind side of the workpiece 26 (see FIG. 7C) the displacement of the mandrel 46 increases at a relatively constant or slightly decreasing load (Zone C). Once the rivet body 42 has fully transitioned to the set rivet position (see FIG. 7C) the load on the mandrel 46 begins another generally linear progression as increasing force is loaded onto the rivet body 42 until the mandrel 46 finally fractures (preferably at the breakaway neck 58) at the top of the curve (Zone D) (see also FIG. 7D).

Figure 8:
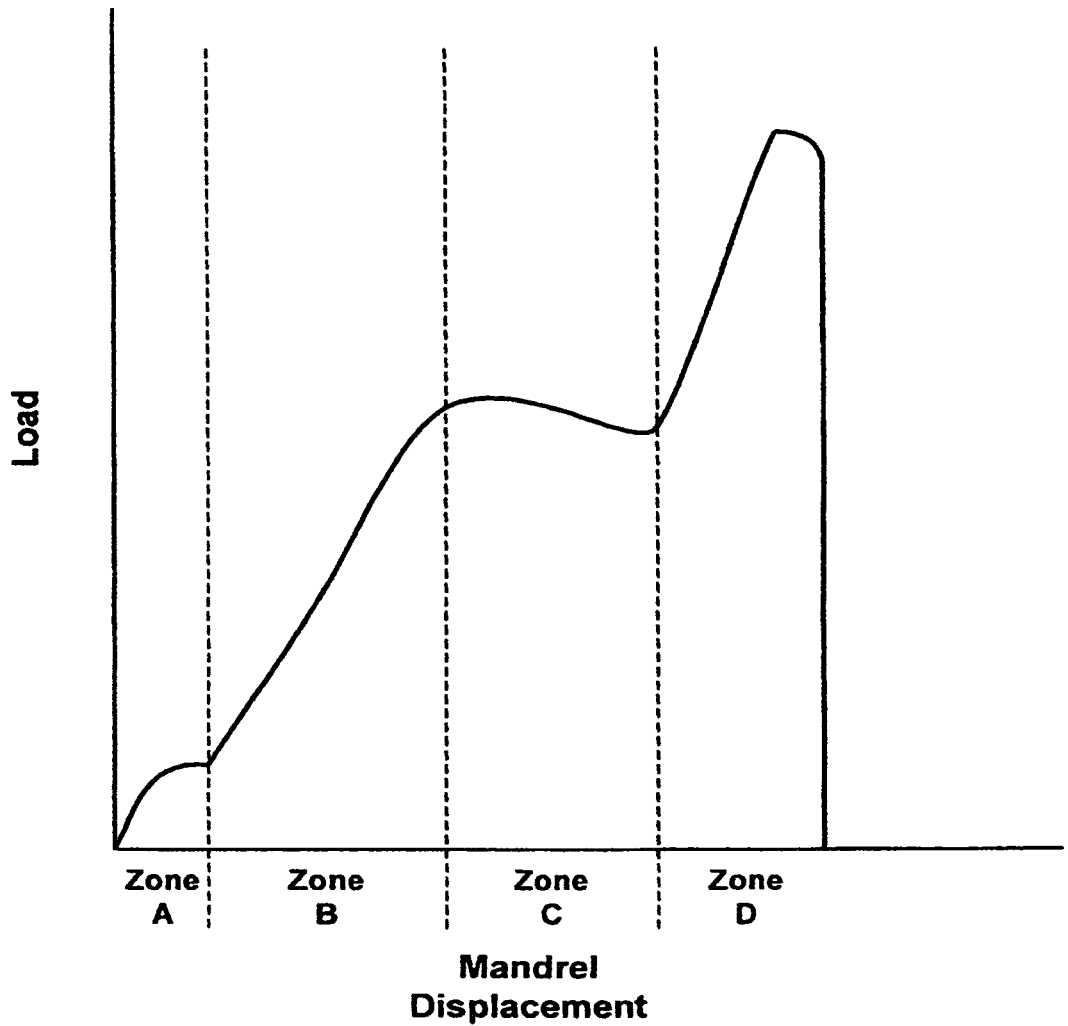
FIG. 8 is a graph of mandrel tensile load vs. mandrel displacement during a rivet setting operation in accordance with conventional rivet setting operations.
Figure 9A:
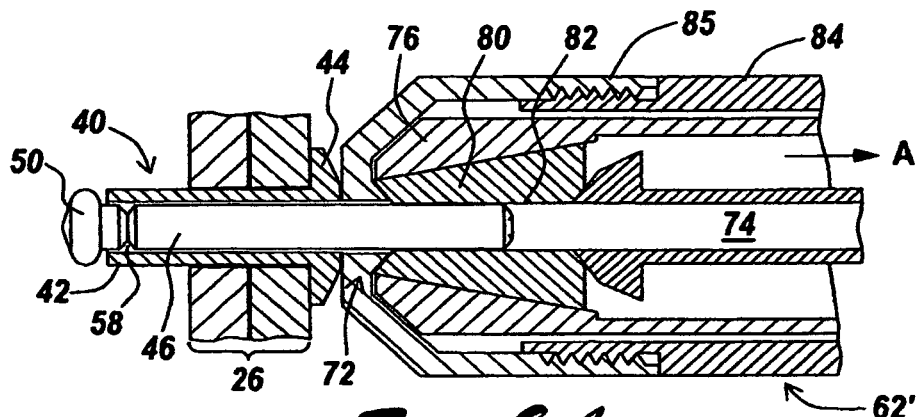
FIGS. 9A, 9B, 9C, 9D, 9E & 9F form a stepwise illustration of the blind rivet being set in a workpiece using the rivet setting tool with a modified nosepiece and modified nose housing, according to one aspect of the present invention.
Figure 9B:
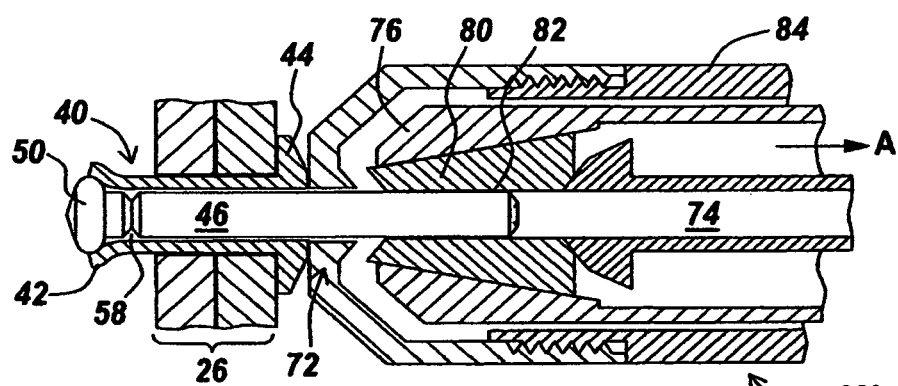
Figure 9C:
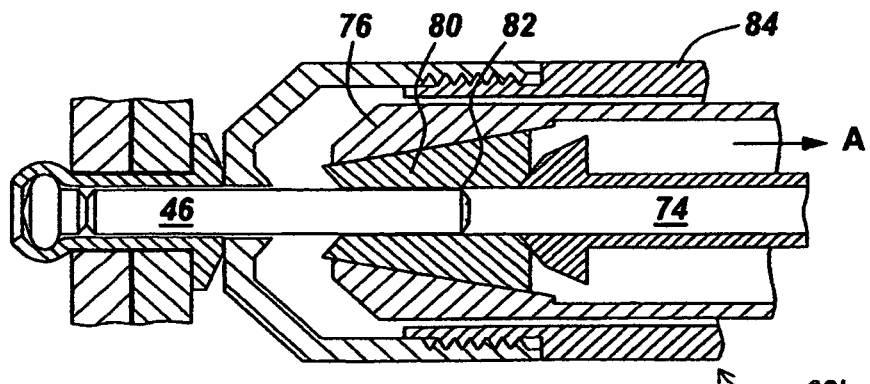
Figure 9D:
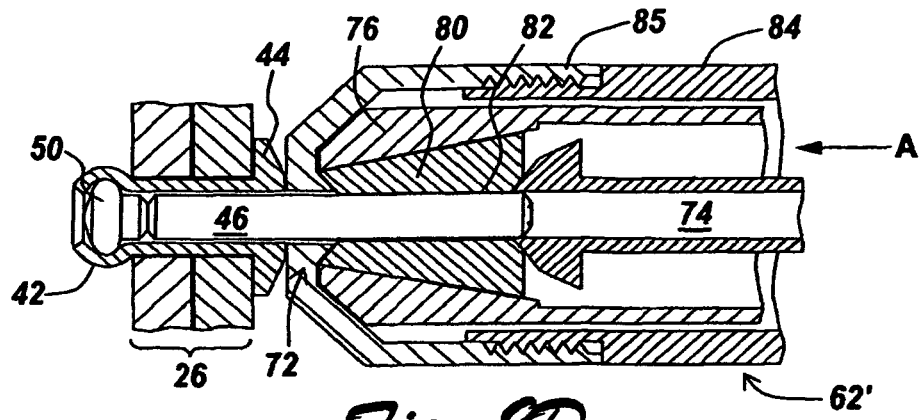

Applicant has further realized that the modified mandrel 46 can in fact be made even shorter than as illustrated in FIGS. 7A through 7D relative to the split jaws 80, taking into account the tensile load curve of FIG. 8. The lower tensile load of Zones A, B, and C, relative to the higher tensile load of Zone D and the point of breakaway creates the potential for having a two-stage pulling process for setting the rivet and enables an even shorter modified mandrel 46. Specifically, as shown in FIG. 7A, the modified mandrel 46, though shorter than a conventional mandrel, still reaches the entire length of the gripping teeth 82 surface of the split jaws 80. If the modified mandrel is additionally shortened to initially reach only approximately 50% (or some amount substantially less than 100%) of the surface of the split jaws 80 as shown in FIG. 9A, there is the potential for the split jaws 80 to eventually slip off the mandrel 46 during the setting process. However, with a two-stage process, the mandrel 46 is pulled, touching about 50% (or some percentage less than 100%) of the split jaws 80 gripping surface, through Zones A, B, and into Zone C. Once the largest diameter portion of the head 50 has fully entered the rivet body 42 (see also FIGS. 9A and 9B) the load increases in a generally linear progression as increasing force is loaded onto the rivet body 42 (Zone B) (see FIG. 9B to 9C). As components of the work piece 26 are pulled together and the blind rivet body 42 expands to fill the void between the body 42 and the work piece 26, and the head 50 approaches the blind side of the workpiece 26 (see also FIG. 9B to FIG. 9C) the displacement of the mandrel 46 increases at a relatively constant or slightly decreasing load (Zone C). Once the rivet body 42 has substantially transitioned to the set rivet position (see FIG. 9C) the load on the mandrel begins another generally linear progression as increasing force is loaded onto the rivet body 42. However, at this point or before with some margin of safety, and prior to the additional increase in force, the split jaws 80 are loosened and re-positioned on the mandrel 46 such that the mandrel 46 is now gripped by substantially 100% of the split jaws 80 gripping surface as shown in FIG. 9D. Said differently, at the end of or during Zone C of the setting process, or slightly before the end, the mandrel 46 is released by the split jaws 80 and inserted further into the mandrel aperture 74 since at this time the rivet body 42 has compressed to allow the head 50 of the mandrel 46 to be closer to the flange 44. The split jaws 80 then re-grip the mandrel 46, with the mandrel 46 now touching the entire gripping surface of the gripping teeth 82 of the split jaws 80.

Figure 9E:
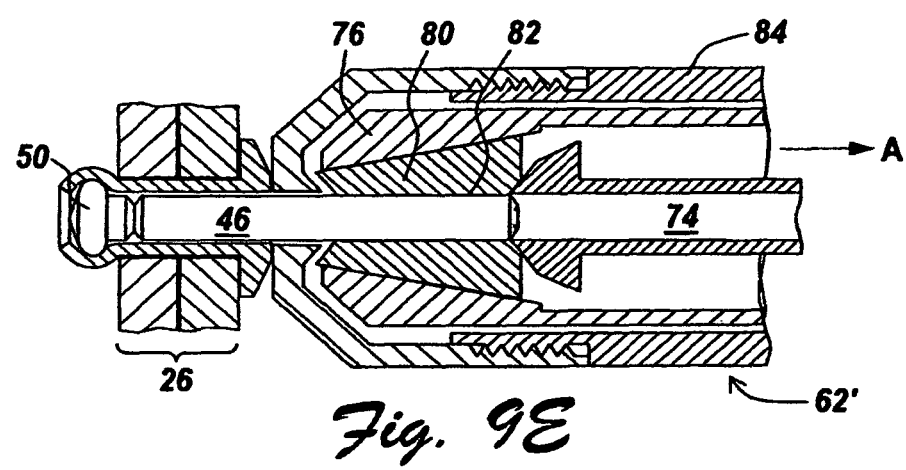
Figure 9F:
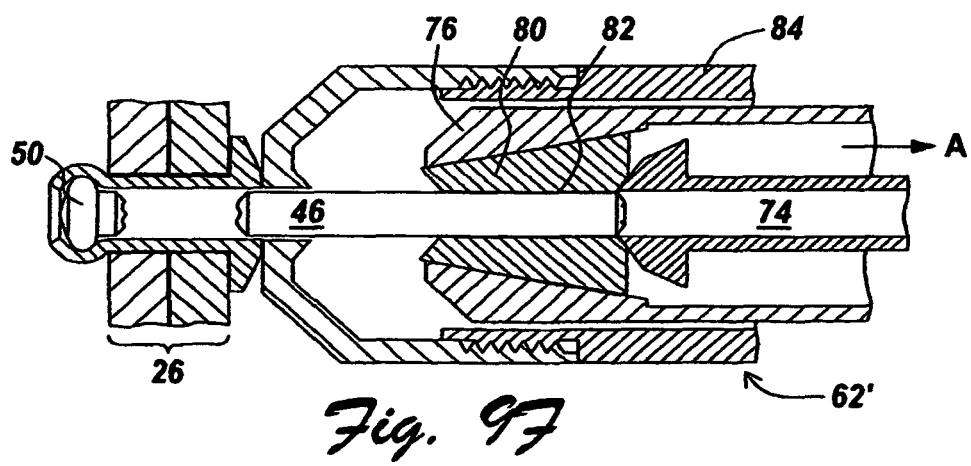

The setting process then continues with the tensile load once again increasing as the split jaws 80 bear down on the mandrel 46 (see FIG. 9E). This continues until the mandrel 46 finally fractures (preferably at the breakaway neck 58) at the top of the curve (Zone D) (see also FIG. 9F). With this two-stage process, the substantially shorter modified mandrel 46 can still be utilized without the potential for slippage at the higher pulling loads due to the repositioning of the split jaws 80 on the mandrel part way through the setting process.

Likewise, such a two-stage process enables use of a modified mandrel having the difference in the length $L_A$ between the length dimension $P_N$ of the exposed mandrel portion 60 and the length dimension $P_{PA}$ of the exposed mandrel portion 30 of the conventional blind rivet 10 being toward the 0.75 inch end of the possible length dimensions for the shortest mandrels with mandrel protrusions of 1.0 inch and up to 1.0 inch for mandrels with mandrel protrusions of 1.25 inch. The potential for the split jaws 80 to slip off of the much shorter modified mandrel 46 is eliminated by the two-stage setting process, where less gripping surface is required for the lower tensile loads, and the full gripping surface is provided for the higher tensile loads at Zone D of the setting process.

The two-stage process described herein can be managed a number of different ways. For example, a user of the riveting tool can control the initiation of the first stage, conclusion of the first stage, re-positioning of the mandrel, initiation of the second stage, and conclusion of the second stage. One way this could be done would be to limit the setting stroke of the riveting tool to a specific length determined by a specific application so the distance the mandrel is pulled in the first stage is correspondingly limited. Alternatively, the riveting tool can be pre-programmed to initiate and conclude each stage based on different criteria, such as for example, time, force applied, position on the tensile load curve of FIG. 8, load realized by the mandrel, material of the workpiece, material and type of rivet and mandrel, and the like. In an automated configuration, the entire two-stage setting process can be controlled, varied, and implemented, by an automated riveting tool. Such a system can receive input from a user/operator, if desired. Likewise, the two-stage process can be two, three, or more stages, as desired or required by the particular workpiece, rivet, mandrel, and environment in which the rivet is set, as would be understood by one of ordinary skill in the art.

The present invention provides a modified blind rivet, and associated rivet setting process and modification allowing use of an easily modified conventional rivet setting tool. The modified blind rivet has a substantially shortened exposed mandrel portion extending beyond the flange of the rivet body. The modified blind rivet can be made using conventional manufacturing processes, yet providing a shorter mandrel for coupling with the rivet body, such that the economical manufacture, packaging, shipping, handling, feeding of the blind rivet, and removal of the spend mandrel, are facilitated. The shorter mandrel directly correlates to the realization of cost savings based on less material use to make the mandrel, lower shipping costs per rivet due to less weight and less volume, improved automated loading of blind rivets into automated riveting tools due to the shorter mandrel, improved collection of spent mandrels by tubular vacuum removal systems that require the spent mandrels to travel through curved tubing (the shorter spent mandrel can maneuver better through such tubing), without sacrificing rivet performance. Additionally, a greater number of the shorter mandrels can be collected in mandrel collection bottles that may be attached to blind rivet setting tools, thus further increasing productivity.

Furthermore, the modified nose housing 84 and modified nosepiece 85 of the present invention enables use of conventional riveting tools with the modified blind rivet. This allows existing manufacturing plants to make use of their existing equipment, with an easily swappable, removable, and replaceable modification to the riveting tools (the modified nose housing and modified nosepiece) to enable use of substantially shorter mandrel blind rivets. Thus, significant capital expenditures are not required to take advantage of the blind rivet of the present invention when existing riveting tools are already in place and in operation.

Numerous modifications and alternative embodiments of the present invention will be apparent to those skilled in the art in view of the foregoing description. Accordingly, this description is to be construed as illustrative only and is for the purpose of teaching those skilled in the art the best mode for carrying out the present invention. Details of the structure may vary substantially without departing from the spirit of the present invention, and exclusive use of all modifications that come within the scope of the appended claims is reserved. It is intended that the present invention be limited only to the extent required by the appended claims and the applicable rules of law.

It is also to be understood that the following claims are to cover generic and specific features of the invention described herein, and all statements of the scope of the invention which, as a matter of language, might be said to fall therebetween.

The invention claimed is:

1. A riveting tool, comprising:
a body;
a pulling force generator for activating the riveting tool;
a jaw assembly within the body, the jaw assembly comprising:
  a jaw case having an angled interior annular surface;
  at least two split jaws disposed against the angled interior annular surface of the jaw case for gripping mandrels of rivets inserted into the riveting tool for setting; and
a plurality of removable and replaceable nosepieces for attachment to the body of the riveting tool, each nosepiece being a different size for receiving mandrels of correspondingly different diameters and comprising:
  a first end having an aperture having a distal end adapted to receive the mandrels of rivets, and a proximal end adapted to contact and hold open at least one split jaw of the at least two split jaws for insertion of the mandrels therethrough;
  a second end having an opening greater in diameter than the aperture, the second end for attachment to the body of the riveting tool;
wherein the distance between the distal and proximal aperture ends of each of the plurality of different sizes of nosepieces is substantially the same.

2. The riveting tool of claim 1, wherein the tool is configured to implement a multi-stage pull and release activation for setting a rivet.

* * * * *